(12) United States Patent
McTigue

(10) Patent No.: US 7,889,081 B2
(45) Date of Patent: Feb. 15, 2011

(54) THERMAL RADIO FREQUENCY IDENTIFICATION SYSTEM AND METHOD

(75) Inventor: Ken R. McTigue, New Windsor, NY (US)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 11/735,662

(22) Filed: Apr. 16, 2007

(65) Prior Publication Data
US 2008/0252455 A1 Oct. 16, 2008

(51) Int. Cl.
G08B 13/14 (2006.01)

(52) U.S. Cl. ............... 340/572.1; 340/572.2; 340/572.3; 340/572.4; 340/572.5; 340/572.6; 340/10.1; 340/10.2; 340/10.3; 340/10.4; 340/10.5; 235/385

(58) Field of Classification Search ... 340/572.1–572.9, 340/10.1–10.5; 455/343.1; 235/385
See application file for complete search history.

(56) References Cited

U.S. PATENT DOCUMENTS

| 3,980,996 | A | 9/1976 | Greenspan et al. |
|---|---|---|---|
| 5,300,875 | A | 4/1994 | Tuttle |
| 5,457,447 | A | 10/1995 | Ghaem et al. |
| 6,798,716 | B1 | 9/2004 | Charych |
| 6,944,424 | B2 | 9/2005 | Heinrich et al. |
| 2005/0146220 | A1 | 7/2005 | Hamel et al. |
| 2006/0055564 | A1* | 3/2006 | Olsen et al. ................. 340/994 |
| 2006/0071756 | A1* | 4/2006 | Steeves ..................... 340/10.1 |
| 2006/0163350 | A1* | 7/2006 | Melton et al. ............... 235/435 |
| 2006/0231109 | A1* | 10/2006 | Howell et al. ............... 128/898 |
| 2006/0238347 | A1 | 10/2006 | Parkinson et al. |
| 2006/0281435 | A1* | 12/2006 | Shearer et al. ........... 455/343.1 |
| 2007/0057793 | A1* | 3/2007 | Alden ..................... 340/572.1 |
| 2007/0096881 | A1* | 5/2007 | Pillai ...................... 340/10.51 |
| 2007/0208841 | A1* | 9/2007 | Barone et al. ............... 709/223 |
| 2007/0229262 | A1* | 10/2007 | Rofougaran ............. 340/572.1 |

* cited by examiner

Primary Examiner—George A Bugg
Assistant Examiner—Ojiako Nwugo
(74) Attorney, Agent, or Firm—William E. Schiesser; Hoffman Warnick LLC

(57) ABSTRACT

An improved solution for radio frequency identification (RFID) systems is provided. In an embodiment of the invention, the RFID tag includes: a power source; a data storage repository; a radio frequency (RF) transmitting element configured to transmit data from the data storage repository, and electrically attached to the power source; and a thermal to electrical energy converter electrically attached to the power source.

19 Claims, 3 Drawing Sheets

THERMAL RADIO FREQUENCY IDENTIFICATION SYSTEM AND METHOD

FIELD OF THE INVENTION

The present invention relates to a radio frequency identification (RFID) tag, and more specifically relates to a thermal RFID system and method.

BACKGROUND OF THE INVENTION

There are a variety of areas in which a need exists for a system capable of identifying and/or tracking the geographic location of portable objects. For example, information technology (IT) assets, such as laptop computers, desktop computers, servers, and the like, are often highly mobile capital items, and often can contain sensitive proprietary data. Consequently, due to the costs and the data contained therein, it is often critical to keep track of the location of such IT assets.

RFID technology, employing RFID tags, are often used to track the location of mobile assets, such as IT assets. RFID tag technologies fall into two general types, namely passive tags (i.e., no internal power source) and active tags (i.e., power supply integrated with the tag). Both passive and active RFID tags suffer from shortcomings, some common to both types, and others particular to the type of tag. For example, both tag types have a limited range of transmission (typically only tens of meters). Additionally, removal of the RFID tag from the asset is undetectable without physical validation. In other words, inadvertent or intentional separation or removal of the tag from the asset is an easy way to render the current systems ineffective. Further, in order to work effectively, both tag types require controlled spaces featuring specifically designed items such as door traps, strategically placed sensors, and the like.

While active RFIDs have their own power source, current power sources have limited life spans and the tag requires physical proximity to any reading device. Any "beacon" strength and frequency is limited by the available power; which is, in turn, related to tag size. As such, in order for an active RFID tag to be effective for highly mobile assets potentially moving across large geographic areas (e.g., railroad cars, laptop computers, etc.), the size of the tag, and concomitantly its power source, would need to be inordinately large.

In view of the foregoing, a need exists to overcome one or more of the deficiencies in the related art.

SUMMARY OF THE INVENTION

Aspects of the invention provide an improved solution for radio frequency identification (RFID) systems.

A first aspect of the invention provides an active radio frequency identification (RFID) tag, comprising: a power source; a data storage repository; a radio frequency (RF) transmitting element configured to transmit data from the data storage repository, and electrically attached to the power source; and a thermal to electrical energy converter electrically attached to the power source.

A second aspect of the invention provides a method of managing an asset with an active radio frequency identification (RFID) tag, comprising: obtaining an active RFID tag comprising: a power source; a data storage repository; a radio frequency (RF) transmitting element configured to transmit data from the data storage repository, and electrically attached to the power source; and a thermal to electrical energy converter electrically attached to the power source; placing the active RFID tag in proximity to the asset; and transmitting data from the RF transmitting element.

A third aspect of the invention provides a computer program comprising program code stored on a computer-readable medium, which when executed, enables a computer system to implement a method of managing an asset with an active radio frequency identification (RFID) tag, wherein the active RFID tag is placed in proximity to the asset, the method comprising: receiving data transmitted from the active RFID tag, wherein the data includes a detected temperature change of the asset obtained from the active RFID tag; and processing the data.

A fourth aspect of the invention provides a radio frequency (RF) system, the system comprising: an active radio frequency identification (RFID) tag, comprising: a power source; a data storage repository; an RF transmitting element configured to transmit data from the data storage repository, and electrically attached to the power source; and a thermal to electrical energy converter electrically attached to the power source.

A fifth aspect of the invention provides a method of generating a system for managing an asset with an active radio frequency identification (RFID) tag, the method comprising: providing a computer system operable to: receive data transmitted from the active RFID tag, wherein the data includes a detected temperature change of the asset obtained from the active RFID tag; and process the data.

A sixth aspect of the invention provides a data processing system for managing an asset with an active radio frequency identification (RFID) tag, comprising: a processing unit; a bus coupled to the processing unit; and a memory medium coupled to the bus comprising program code, which when executed by the processing unit causes the data processing system to: receive data transmitted from the active RFID tag, wherein the data includes a detected temperature change of the asset obtained from the active RFID tag; and process the data.

A seventh aspect of the invention provides computer software embodied in at least one propagated signal for managing an asset with an active radio frequency identification (RFID) tag, the at least one propagated signal comprising instructions for causing at least computer system to: receive data transmitted from the active RFID tag, wherein the data includes a detected temperature change of the asset obtained from the active RFID tag; and process the data.

An eighth aspect of the invention provides a business method for managing an asset with an active radio frequency identification (RFID) tag, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
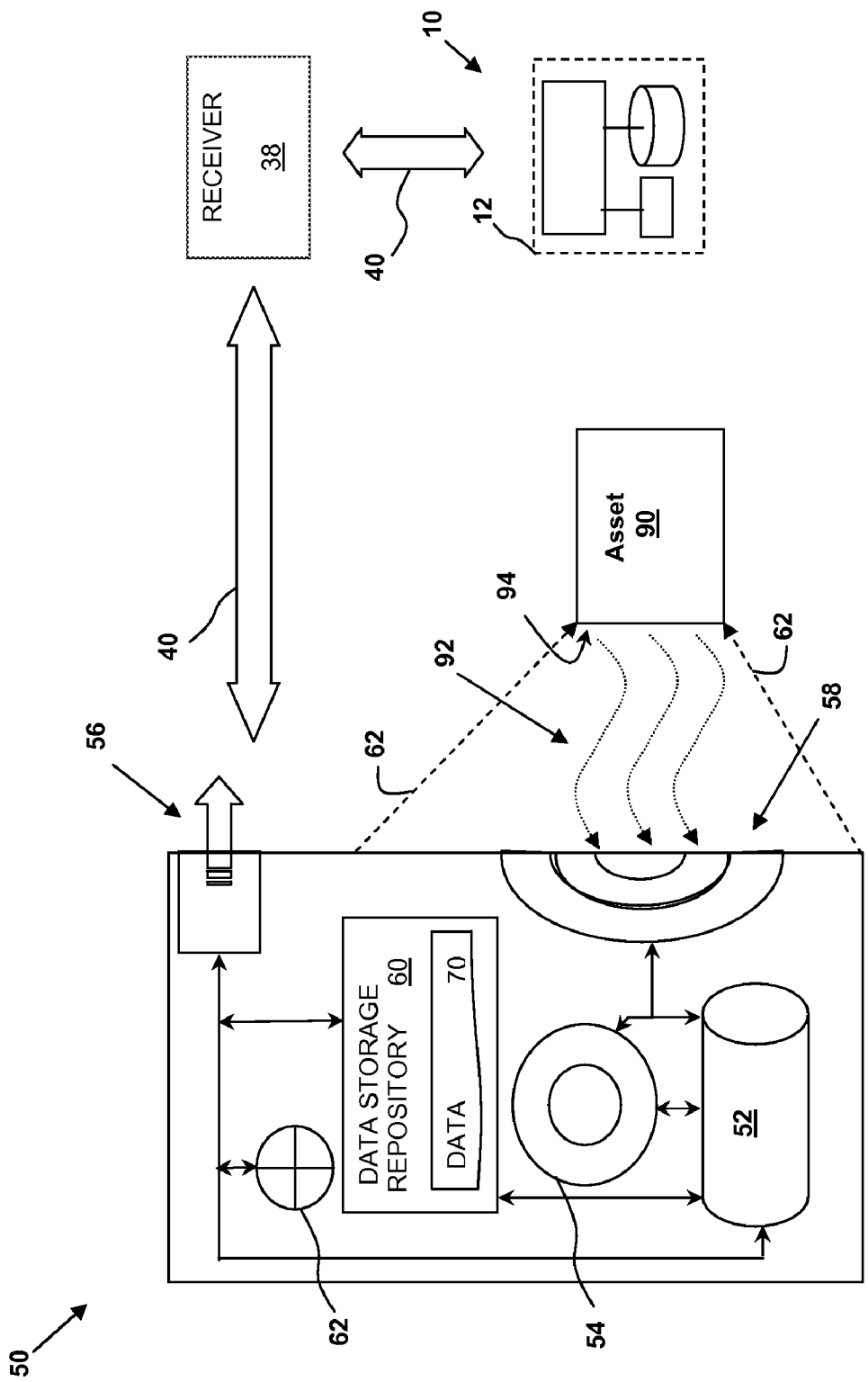
FIG. 1 depicts an illustrative thermally rechargeable active RFID tag in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the invention provide an improved solution for radio frequency identification (RFID) systems. In an embodiment of the invention, an active RFID tag includes a power source; a radio frequency transmitting element, configured to transmit data, electrically attached to the power source; and a thermal energy to electrical energy converter, electrically attached to the power source. As used herein, unless otherwise noted, the term "set" means one or more (i.e., at least one); and the phrase "any solution" means any now known or later developed solution.

As detailed herein, the present invention is directed to a thermal RFID system and method. Turning to the drawings, FIG. 1 depicts an illustrative thermally rechargeable active RFID tag 50 in accordance with an embodiment of the present invention. The RFID tag 50 may include various elements such as a power source 52, a radio frequency (RF) transmitter 56, a thermal to electrical energy converter 58, and a data storage repository (e.g., chip) 60. The RFID tag 50 may be located in proximity to an asset 90. Additionally, the RFID tag 50 may communicate 40 (e.g., transmit and/or receive) with a system 10 via an RF receiver 38, in accordance with embodiments of the present invention.

The power source 52 may comprise a battery or other suitable source of electrical energy, including DC current. The power source 52 may be a rechargeable battery. The thermal to electrical energy converter 58, which may include for example a thermocouple, is in electrical communication with the power source 52. The RFID tag 50 may be externally attached, affixed (e.g., placed on, in, near, etc.) and/or be integrated (e.g., internally embedded, etc.) to the asset 90, as denoted by 62. For example, the RFID tag 50 may be adhered to a surface 94 of the asset 90. The asset 90 may be any item, including a mobile item(s), semi-mobile item(s), and/or non-mobile item(s). For example, in an embodiment, the asset 90 may be an information technology (IT) asset (e.g., server, desktop computer, laptop computer, etc.). By locating the thermocouple 58 on, near, and/or adjacent to a portion of the asset 90 (e.g., server), the thermocouple 58 may create electrical energy (e.g., via juncture of two different metals) from the thermal energy 92 of the asset 90. The thermocouple 58 typically may measure the temperature difference at two different locations on the asset 90 by employing dissimilar metals to complete a circuit and obtain different voltages (via the dissimilar metals). The differing voltages will be available for measurement, will also differ with changes in temperature. In this manner, temperature change and voltage change may be measured and harnessed. The thermocouple 58 may additionally employ cold junction compensation in an embodiment. The thermocouple 58 may be of any suitable solution for converting thermal energy 92 to electrical energy, including Types K, E, J, N, S, T, etc. thermocouples 58. Other suitable solutions for providing thermal to electrical energy converters 58 may be employed that harness the Peltier-Seebeck, or thermoelectric effect, such as a thermopile (e.g., series of thermocouples), a thermal diode, a thermal electric generator (e.g., radioisotope thermoelectric generator), and/or the like. In this manner, the RFID tag 50 is able to obtain, or generate, electrical energy in addition to that provided by the power source 52.

The RFID tag 50 may further comprise a time clock 62 and a capacitor 54, both in electrical communication with at least one of the power source 52 and the thermal to electrical energy converter 58.

The data storage repository 60 may include a computer chip or other suitable element for storing data 70. The data 70 may include any information that assists, ultimately, in the management of the asset 90. For example, data 70 may include the owner of the asset 90, a model number, a model type, a serial number, a time count provided by the time clock 62, and/or any configuration management data. Configuration management data may include items such as normal operating temperature, normal temperature change, actual temperature, actual change in temperature, and/or the like.

In any event, under aspects of the present invention, the RFID tag 50 is able to obtain additional electrical energy from thermal energy provided by the asset 90 to which the RFID tag 50 is assigned (e.g., attached to). In this manner, the battery 52 may be recharged as necessary. Additionally, the capacitor 54 is trickled charged by thermal energy 92 given off by the asset 90. As a result, the capacitor 54 could cause the RF transmitter 56 to send data (e.g., "signal beacon") to the RF receiver 38 upon the capacitor 54 reaching its full electrical capacity, or charge.

In this manner, the RFID tag 50, besides from being electrically rechargeable, is able to, via detecting the temperature of the asset 90, obtain data 70 that is effectively able to discern the status of the asset 90. The data 70 may include various temperature information that can determine, or aid in determining, various operating information of the asset 90 including, for example, that the asset 90 is moved to storage, active in use, RFID tag 50 is removed/off, and/or the like. Other, even brief changes in status (e.g., asset 90 is shut down to move, etc.) are detectable by the RFID tag 50 by virtue of the temperature detection capability of the thermal to electrical energy converter 58.

The RF receiver 38 may be any device, or system of devices, suitable for receiving and/or sending data with RF transmitter 56. For example, RF receiver 38 may include a local receiver, a scanner, a hot spot, WIFI a cellular point, and/or the like. The RF transmitter 56 may transmit data in various formats. For example, the data may have the complexity level of an internet protocol (IP) "ping", including information such as serial number, global positioning system (GPS) relevant data, average temperature run rate, and/or the like.

Figure 2:
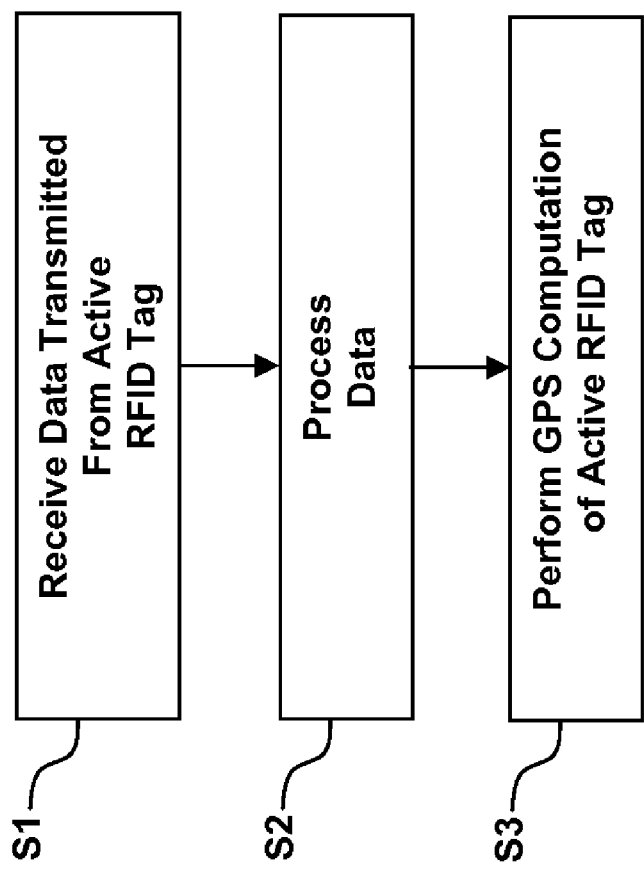
FIG. 2 depicts a flow diagram of an illustrative process in accordance with an embodiment of the present invention.
Figure 3:
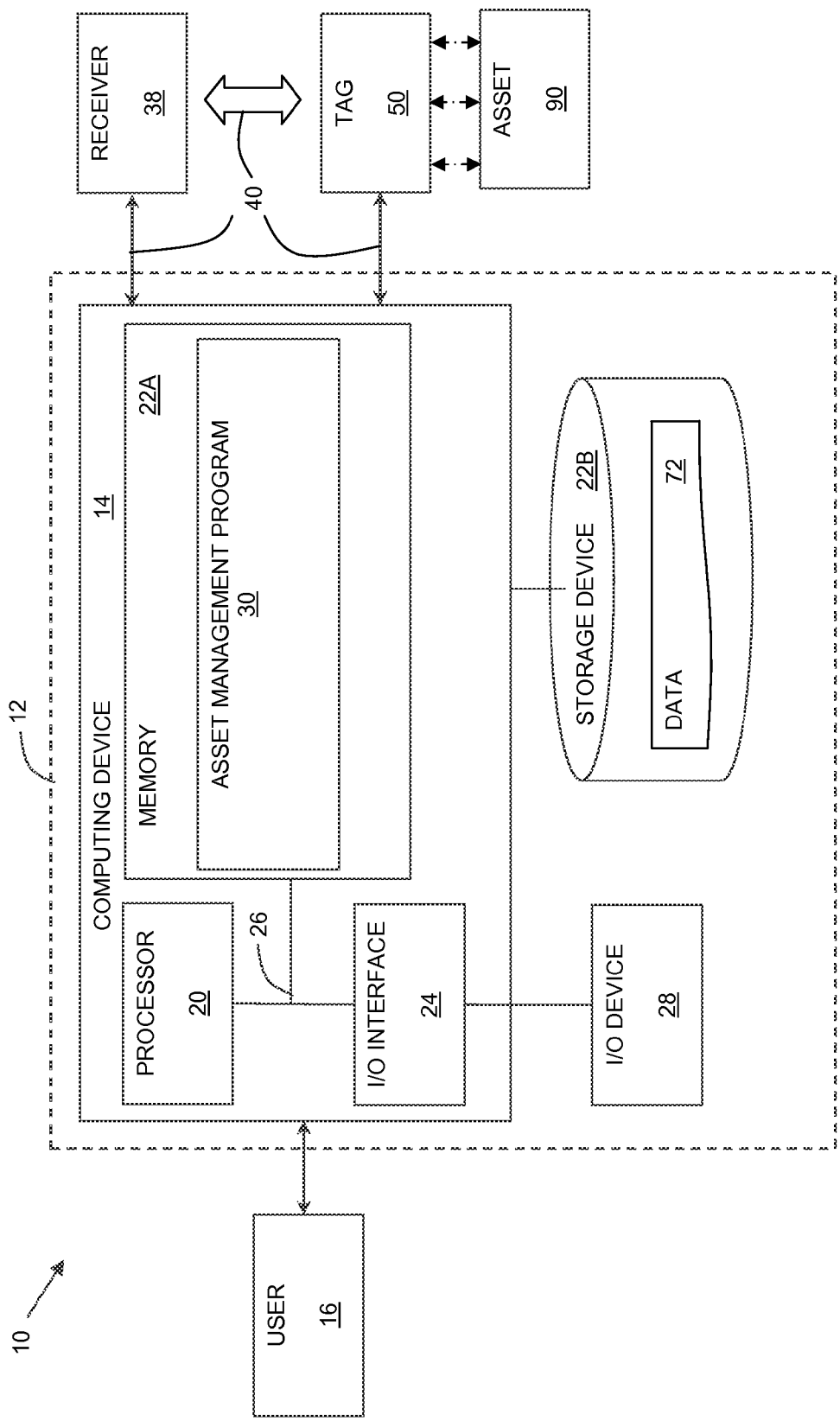
FIG. 3 depicts an environment of an illustrative system in accordance with an embodiment of the present invention.

FIG. 2 depicts a flow diagram of an illustrative process in accordance with an embodiment of the present invention. The process is described herein with reference to FIGS. 1-3 and includes S1 wherein data 70 is transmitted 40 by the RF transmitter 56 to RF receiver 38 and ultimately received by system 10 (FIG. 3). The data 70 as discussed herein may include temperature information of the asset 90. Other information may be included with data 70. In any event, at S2 the data 70 is processed by system 10. For example, the temperature information received, at S1, may be compared to various temperature information stored in data 72 related to that particular asset 90. In this manner, embodiments of the invention allow for determining whether the asset 90 is operating within acceptable temperature tolerances. Alternatively, the system 10 may detect that the RF transmitter 56 has not received a certain "beacon" signal and, as a result, then process this information. The method may further include S3, wherein a global positioning system performs a computation of the active RFID tag 50 (FIG. 1). In this manner, the manner may include, for example, determining a location of the active RFID tag 50, determining a change in location of the active RFID tag 50, and/or the like.

FIG. 3 shows an illustrative environment 10 for managing an asset 90 with an active RFID tag 50 according to an embodiment of the invention. To this extent, environment 10 includes a computer system 12 that can perform the process described herein in order to manage an asset 90 with an active RFID tag 50. In particular, computer system 12 is shown including a computing device 14 that comprises an asset management program 30, which makes computing device 14 operable for managing an asset 90 with an active RFID tag 50, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as asset management program 30, which is stored in a storage system, such as memory 22A and/or storage device 22B. While executing program code, processor 20 can read and/or write data, such as data 72 (e.g., temperature, asset information, etc.) to/from memory 22A, storage device 22B, and/or I/O interface 24. Bus 26 provides a communications link between each of the components in computing device 14. I/O device 28 can comprise any device that transfers information between a user 16 and computing device 14 and/or other elements (e.g., RF receiver 38, RFID tag 50, etc.) and computing device 14. To this extent, I/O device 28 can comprise a user I/O device to enable an individual user 16 to interact with computing device 14 and/or a communications device to enable an element, such as a RF receiver 38 and/or a RFID tag 50, to communicate with computing device 14 using any type of communications link.

In any event, computing device 14 can comprise any general purpose computing article of manufacture capable of executing program code installed thereon. However, it is understood that computing device 14 and asset management program 30 are only representative of various possible equivalent computing devices that may perform the process described herein. To this extent, in other embodiments, the functionality provided by computing device 14 and asset management program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, asset management program 30 enables computer system 12 to manage an asset 90 with an active RFID tag 50. To this extent, an asset management program 30 is shown in FIG. 3. However, it is understood that, for example, various modules and/or functionality of asset management program 30 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

In another embodiment, the invention provides a computer program stored on a computer-readable medium, which when executed, enables a computer system to manage an asset 90 with an active RFID tag 50. To this extent, the computer-readable medium includes program code, such as asset management program 30 (FIG. 3), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 3) and/or storage system 22B (FIG. 3), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing an asset 90 with an active RFID tag 50. In this case, a computer system, such as computer system 12 (FIG. 3), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 3), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages an asset 90 with an active RFID tag 50, which enables users to perform the process described herein on a subscription, advertising, and/or fee basis. That is, a service provider could offer to manage a network and/or a computer system 12 (FIG. 3) that allows users to manage assets 90 with active RFID tags 50 as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system, comprising:
   an information technology asset; and
   an active radio frequency identification (RFID) tag, comprising:
   a power source;
   a data storage repository;
   a radio frequency (RF) transmitting element configured to transmit data from the data storage repository, and electrically attached to the power source;
   a thermal to electrical energy converter electrically attached to the power source, wherein the thermal to electrical energy converter receives thermal energy from the information technology asset and is a second power source for the RFID tag; and
   a capacitor electrically connected to one of the power source or the thermal to electrical energy converter, wherein the RF transmitting element transmits the data upon the capacitor being recharged to a threshold.

2. The system of claim 1, wherein the thermal to electrical energy converter comprises a thermocouple.

3. The system of claim 1, wherein the data is at least one selected from a group consisting of: an owner, the temperature change, a serial number, a time count, a manufacturer, a model, and configuration management data.

4. The system of claim 1, wherein the active RFID tag further comprises a clock device electrically connected to one of the power source or the thermal to electrical energy converter.

5. The system of claim 1, wherein the power source is rechargeable from the thermal to electrical energy converter.

6. The system of claim 1, wherein the active RFID tag is integrated with the information technology asset.

7. The system of claim 1, wherein the active RFID tag is adhered to a surface of the information technology asset.

8. The system of claim 1, wherein the transmitted data determines an operating status of the information technology asset.

9. The system of claim 8, wherein the operating status is selected from a group consisting of: the information technology asset is moved to storage; the information technology asset is active; the information technology asset is in use; the active RFID tag has been removed from the information technology asset; and the active RFID tag is off.

10. A method of managing an asset with an active radio frequency identification (RFID) tag, comprising:
    placing the active RFID tag in proximity to the asset, wherein the asset is an information technology asset, the active RFID tag comprising:
    a power source;
    a data storage repository;
    a radio frequency (RF) transmitting element configured to transmit data from the data storage repository, and electrically attached to the power source;
    a thermal to electrical energy converter electrically attached to the power source, wherein the thermal to electrical energy converter receives thermal energy from the asset and is a second power source for the RFID tag; and
    a capacitor electrically connected to one of the power source or the thermal to electrical energy converter, wherein the RF transmitting element transmits the data upon the capacitor being recharged to a threshold.

11. A computer program comprising program code stored on a computer-readable storage medium, which when executed, enables a computer system to implement a method of managing an asset with an active radio frequency identification (RFID) tag, the method comprising:
    receiving data transmitted from the active RFID tag, wherein the data includes a detected temperature change of the asset obtained from the active RFID tag wherein the active RFID tag includes a thermal to electrical energy converter, wherein the asset is an information technology asset, wherein the thermal to electrical energy converter receives thermal energy from the asset and is a power source for the RFID tag, and wherein the active RFID tag includes a capacitor electrically connected to one of the power source or the thermal to electrical energy converter, wherein the RF transmitting element transmits the data upon the capacitor being recharged to a threshold; and
    processing the data.

12. The method of claim 11, further comprising performing a global positioning system (GPS) computation of the active RFID tag.

13. The method of claim 11, the processing comprising determining if the data includes a beacon signal that has ceased being transmitted from the active RFID tag.

14. The method of claim 11, further comprising wherein the thermal to electrical energy converter is configured to detect a temperature change associated with the asset, and wherein the detected temperature change causes the RF transmitting element to transmit the data and the processing comprising comparing the detected temperature change with a datum temperature change of the asset.

15. A radio frequency (RF) system, the system comprising:
    an information technology asset;
    an active radio frequency identification (RFID) tag, wherein the active RFID tag is associated with the information technology asset, comprising:
    a power source;
    a data storage repository;
    an RF transmitting element configured to transmit data from the data storage repository, and electrically attached to the power source;
    a thermal to electrical energy converter electrically attached to the power source, wherein the thermal to electrical energy converter receives thermal energy from the information technology asset and is a second power source for the RFID tag; and
    a capacitor electrically connected to one of the power source or the thermal to electrical energy converter, wherein the RF transmitting element transmits the data upon the capacitor being recharged to a threshold; and
    a computer system configured to manage the information technology asset using the transmitted data, wherein the computer system determines an operating status of the information technology asset using the transmitted data.

16. The RF system of claim 15, further comprising an RF receiver, configured to receive data from the RF transmitting element and provide data to the computer system in response to receiving the data.

17. A method of generating a system for managing an asset with an active radio frequency identification (RFID) tag, the method comprising:
provide a computer system operable to:
receive data transmitted from the active RFID tag, wherein the data includes a detected temperature change of the asset obtained from the active RFID tag; and
process the data; and
providing an active RFID tag, wherein the active RFID tag is placed in proximity to the asset, the active RFID tag comprising:
a power source;
a data storage repository;
a radio frequency (RF) transmitting element configured to transmit data from the data storage repository, and electrically attached to the power source;
a thermal to electrical energy converter electrically attached to the power source, wherein the thermal to electrical energy converter receives thermal energy from the information technology asset and is a second power source for the RFID tag; and
a capacitor electrically connected to one of the power source or the thermal to electrical energy converter, wherein the RF transmitting element transmits the data upon the capacitor being recharged to a threshold.

18. The method of claim 17, the processing comprising determining if the data includes a beacon signal that has ceased being transmitted from the active RFID tag.

19. The method of claim 17, further comprising wherein the thermal to electrical energy converter is configured to detect a temperature change associated with the asset, and wherein the detected temperature change causes the RF transmitting element to transmit the data and the processing comprising comparing the detected temperature change with a datum temperature change of the asset.

* * * * *